(12) United States Patent
Baek

(10) Patent No.: US 11,995,521 B2
(45) Date of Patent: May 28, 2024

(54) CROSS-MODEL SCORE NORMALIZATION

(71) Applicant: Dropbox, Inc., San Francisco, CA (US)

(72) Inventor: Jongmin Baek, Millbrae, CA (US)

(73) Assignee: Dropbox, Inc., San Francisco, CA (US)

( * ) Notice: Subject to any disclaimer, the term of this patent is extended or adjusted under 35 U.S.C. 154(b) by 1162 days.

(21) Appl. No.: 16/681,599

(22) Filed: Nov. 12, 2019

(65) Prior Publication Data

US 2021/0089963 A1 Mar. 25, 2021

Related U.S. Application Data

(60) Provisional application No. 62/904,053, filed on Sep. 23, 2019.

(51) Int. Cl.
| | |
|---|---|
| *G06N 20/00* | (2019.01) |
| *G06F 16/16* | (2019.01) |
| *G06F 16/93* | (2019.01) |
| *G06N 5/04* | (2023.01) |
| *H04L 67/10* | (2022.01) |

(52) U.S. Cl.
CPC ............ *G06N 20/00* (2019.01); *G06F 16/16* (2019.01); *G06F 16/93* (2019.01); *G06N 5/04* (2013.01); *H04L 67/10* (2013.01)

(58) Field of Classification Search
CPC .......... G06N 20/00; G06N 5/04; G06F 16/93; G06F 16/16; H04L 67/10
See application file for complete search history.

(56) References Cited

U.S. PATENT DOCUMENTS

| | | | |
|---|---|---|---|
| 7,610,306 B2 | 10/2009 | Lin et al. | |
| 8,131,705 B2 | 3/2012 | Chevalier et al. | |
| 8,370,280 B1* | 2/2013 | Lin ......................... | G06N 5/04 |
| | | | 706/12 |
| 9,720,607 B2 | 8/2017 | Cowling et al. | |
| 10,452,993 B1* | 10/2019 | Hart ...................... | G06N 20/00 |
| 2007/0239642 A1* | 10/2007 | Sindhwani ............... | G06N 3/08 |
| | | | 706/25 |

(Continued)

OTHER PUBLICATIONS

Farla et al., "Learning to Rank for Content-Based Image Retrieval", MIR'10, dated Mar. 29-31, 2010, Philadelphia, Pennsylvania, USA, 10 pages.

*Primary Examiner* — Hope C Sheffield
(74) *Attorney, Agent, or Firm* — Keller Preece PLLC

(57) ABSTRACT

Computer-implemented techniques encompass using distinct machine learning sub-models to score respective types of candidate content for the purpose of providing personalized content suggestions to end-users of a content management system. The relevancy scores generated by the distinct sub-models are mapped to expected end-user interaction scores of the candidate content scored. Content suggestions are provided at end-users' computing devices where the suggested content is selected from the candidate content based on the expected end-user interaction scores of the candidate content. For each distinct sub-model, a normalizing mapping function is solved using an optimizer that maps the relevancy scores generated by the sub-model for the candidate content to expected end-user interaction scores for the candidate content. The expected end-user interaction scores are comparable across the distinct sub-models and can be used to rank content suggestions across the distinct sub-models.

20 Claims, 7 Drawing Sheets

(56) References Cited

U.S. PATENT DOCUMENTS

| | | | | |
|---|---|---|---|---|
| 2010/0293175 | A1* | 11/2010 | Vadrevu | G06F 16/951 |
| | | | | 707/754 |
| 2012/0222133 | A1 | 8/2012 | Kidron | |
| 2014/0181204 | A1* | 6/2014 | Sharp | G06F 16/9535 |
| | | | | 709/204 |
| 2016/0140125 | A1* | 5/2016 | Goyal | G06F 16/90324 |
| | | | | 707/751 |
| 2019/0205534 | A1* | 7/2019 | Marecki | G06F 9/5011 |
| 2020/0372073 | A1* | 11/2020 | Dahl | G06V 10/82 |

* cited by examiner

CROSS-MODEL SCORE NORMALIZATION

BENEFIT CLAIM

This application claims the benefit of U.S. provisional application No. 62/904,053, filed Sep. 23, 2019, the entire contents of which is hereby incorporated by reference as if fully set forth herein, under 35 U.S.C. § 119(e).

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

Some embodiments of the present invention relate to computer-implemented techniques for normalizing relevancy scores of content items generated by different machine learning models based on expected end-user interaction scores.

BACKGROUND

Today's workers must manage digital information overload. There is seemingly a constant flood of electronic mail messages, text messages, application notifications that a worker needs to handle in a manner that is not disruptive to or distracting from the worker's primary tasks at hand. And while trying to avoid disruption and distraction, the worker must also be able to quickly navigate large corpuses of heterogenous digital content to find the content the worker needs now. These corpuses may contain large amounts (e.g., gigabytes, terabytes, or more) of different types of digital content (or just "content") including large-numbers (e.g., hundreds, thousands, or more) of files, folders, photos, images, document, spreadsheets, presentations, videos, cloud documents, etc.

In some cases, workers and businesses have turned to content management computing systems (or just "content management systems") that provide a centrally-hosted network filesystem for storing and managing their digital content. These systems may offer other features to end-users in addition to a content hosting feature. For example, such systems may offer the ability to synchronize changes to content between network-connected devices, the ability to share content over a network with different users, and the ability to collaborate on the creation of content.

One feature a content management system may offer to end-users is a content suggestion feature. A goal of the content suggestion feature may be to make it easier for end-users to find the content they most likely need right now as effortless as possible. For example, a computer graphical user interface provided by the content management system at an end-user's computing device through an end-user application such as a mobile application or a web browser might include a "suggested for you" section that the end-user is presented with after authenticating with the content management system (e.g., by signing into the end-user's account held with the content management system). The section might indicate suggested content that the end-user might be looking for. The content management system might identify the suggested content based on heuristic such as, for example, content the end-user has recently accessed in the content management system or content the end-user frequently accesses in the content management system.

Another way the content management system might identify suggested content is to use machine learning. In particular, a content suggestion module of the content management system might employ a machine learning prediction pipeline. The prediction pipeline might include the general steps of: (1) identifying candidate content to compute relevancy scores for, (2) fetching signals (predictors) about the candidate content that are predictive of relevancy, (3) encoding the fetched signals as feature vectors, (4) inputting the feature vectors into a trained machine learning model to compute the relevancy scores for the candidate content, and (5) suggesting some of the best scoring candidate content to end users.

A technical challenge using machine learning to predict content an end-user might be interested in is that the candidate content may encompass disparate types of content. For example, the candidate content may encompass files, folders, and cloud documents, including different types of files and different types of cloud documents. The different types of content may be stored in different data stores, be associated with different metadata, and accessed by end-users in different ways and to different extents. As a result, it may be impractical to implement a single machine learning prediction pipeline including training a single machine learning model to make predictions for different types of content. Even if it is practical to implement a single machine learning prediction pipeline or machine learning model for scoring different types of content as to relevancy, there may be other technical reasons for using distinct pipelines and distinct machine learning models for different types of content. Such other technical reasons may include, for example, those given above. In particular, the different types of content may be stored in different data stores, be associated with different metadata, or accessed by end-users in different ways and to different extents.

Disclosed embodiments address this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

DETAILED DESCRIPTION

Figure 1:
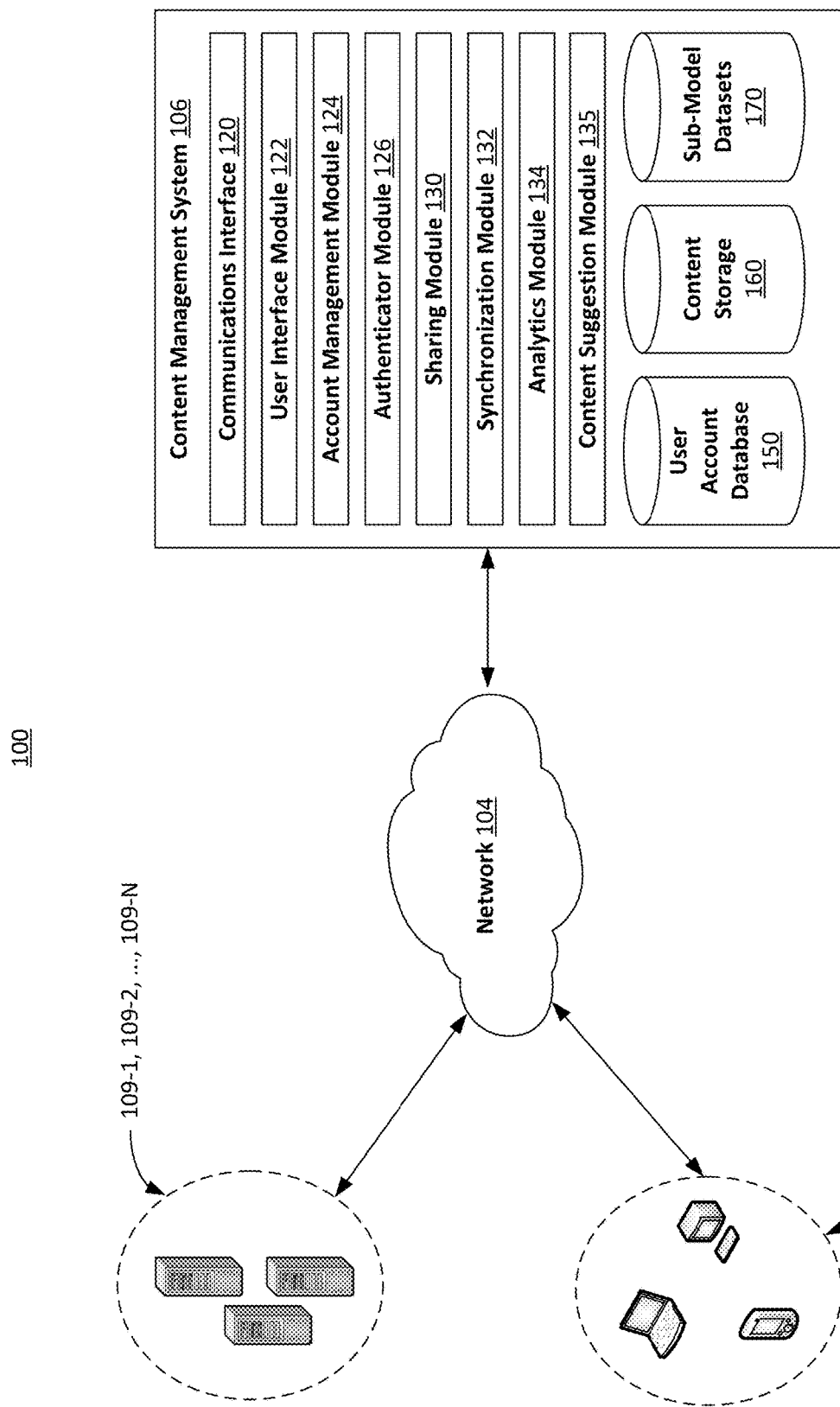
FIG. 1 illustrates an example content management system environment, according to some embodiments.

In the following description, for the purposes of explanation, numerous specific details are set forth in order to provide a thorough understanding of some embodiments of the present invention. It will be apparent, however, that some embodiments of the present invention may be practiced without these specific details. In other instances, some structures and devices are shown in block diagram form in order to avoid unnecessarily obscuring some embodiments of the present invention.

General Overview

According to some embodiments, computer-implemented techniques encompass using distinct machine learning sub-models to score respective types of candidate content for the purpose of providing personalized content suggestions to an end-user. The relevancy scores generated by the distinct sub-models are mapped to expected end-user interaction scores (sometimes referred to herein as "expected EIS") of the candidate content scored. A content suggestion is provided at the end-user's computing device where the suggested content is selected from the candidate content based on the expected EISs of the candidate content.

The techniques treat the distinct sub-models as "black-box" content scoring functions. For each distinct sub-model, a normalizing mapping function is solved for that maps the relevancy scores generated by the sub-model for the candidate content to expected EISs for the candidate content. The expected EISs are comparable across the distinct sub-models and can be used to rank content suggestions across the distinct sub-models. According to some embodiments, the normalizing mapping functions solved for are represented as cubic splines that allow for discrete representations of the normalizing mapping functions.

By doing so, the content suggestions of the distinct sub-models can be ranked against one another even if the relevancy scores generated by the distinct sub-models cannot meaningfully be ranked against one another. The approach allows the creation and use of the distinct machine learning sub-models to score disparate types of content for the purpose of providing personalized content suggestions for individual content types to end-users. At the same time, the approach can be used to bring the distinct sub-models together for the purpose of providing personalized content suggestions across disparate content types. Thus, the techniques improve the functioning of content management systems that suggest different types of content to end-users.

As used herein, the term machine learning model, as in machine learning sub-model, refers to a computer-implemented mathematical model constructed (learned) by a computer-executed algorithm (a machine learning algorithm) from a set of data (training data) such that a computer-executed algorithm can use the learned model to make predictions or decisions about new data without having to be explicitly programmed to do so. A common type of machine learning is supervised learning in which a machine learning algorithm (e.g., a classifier or a regression algorithm) constructs (learns) a computer-implemented mathematical model from a set of data that contains inputs and desired outputs (labels). Other types of machine learning include semi-supervised machine learning and unsupervised learning.

Example Content Management System Environment

According to some embodiments, the techniques for cross-model score normalizing are implemented in a content management system environment such as example content management system environment 100 is shown in FIG. 1, wherein electronic devices communicate via a network for purposes of exchanging content and other data. Content management computing system 106 can be configured for use on a wide area network such as that illustrated in FIG. 1. However, the techniques may be implemented in a wide variety of network configurations that facilitate the intercommunication of electronic devices. For example, each of the components in environment 100 in FIG. 1 can be implemented in a localized or distributed fashion in a network.

In environment 100, an end-user can interact with content management system 106 through end-user computing devices 102-1, 102-2, . . . , 102-N (collectively "102") connected to network 104 (e.g., network 722 or network 728) by direct and/or indirect communication. Network 104 provides data communication pathways to end-user computing devices 102. Content management system 106 can include a single computing device (e.g., a server) or multiple computing devices (e.g., multiple servers) that are configured to perform the functions and/or operations necessary to provide the services described herein.

Content management system 106 can support connections from a variety of different end-user devices, such as: desktop computers; mobile computers; mobile communications devices, e.g. mobile phones, smart phones, tablets; smart televisions; set-top boxes; and/or any other network enabled computing devices.

End-user computing devices 102 can be of varying type, capabilities, operating systems, etc. Furthermore, content management system 106 can concurrently accept connections from and interact with multiple end-user devices 102.

An end-user can interact with content management system 106 via an end-user application installed on end-user device 102-X. In some embodiments, the end-user application can include a component dedicated to content management system 106. For example, the component can be a stand-alone application, one or more application plug-ins, or a browser extension. However, the end-user can also interact with content management system 106 via a third-party application, such as a web browser, that executed on end-user device 102-X and is capable of communicating with content management system 106. In either case, the end-user application can present a user interface (UI) for the end-user to interact with content management system 106. For example, the end-user can interact with the content management system 106 via an end-user application integrated with the file system or via a webpage displayed using a web browser application.

Content management system 106 can enable an end-user to store content items, as well as perform a variety of content management tasks, such as download, view, edit, share, comment on, search, or browse the content items. Furthermore, content management system 106 can enable an end-user to access the content from multiple end-user devices 102. For example, end-user device 102-X can upload content to content management system 106 via network 104. Later, the same end-user device 102-X or some other end-user device 102-Y can retrieve the content from content management system 106.

To facilitate the various content management services, an end-user can create an account with content management system 106. User account database 150 can maintain the account information. User account database 150 can store profile information for registered users. In some cases, the only personal information in the user profile can be a username or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, other types of files, cloud documents, feed items (e.g., social networking, content item, or professional network feed items) etc., from one or more end-user devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple end-users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from end-users so that end-users do not need to know exactly where or how the content items are being stored by content management system 106. In some embodiments, content management system 106 can store the content items in the same collection hierarchy as they appear on end-user device 102-X. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth. According to some embodiments, content storage 160 encompasses a block-based append-only distributed data storage system supporting open and closed extents such as described in U.S. Pat. No. 9,720,607.

Content storage 160 can also store metadata describing content items, content item types, and the relationship of content items to various accounts, collections, or groups.

The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more end-user devices 102. The synchronization can be platform agnostic. That is, the content items can be synchronized across multiple end-user devices 102 of varying type, capabilities, operating systems, etc. For example, end-user device 102-X can include end-user software, which synchronizes, via a synchronization module 132 at content management system 106, content in end-user device 102-X's file system with the content in an associated user account. In some cases, the end-user software can synchronize any changes to content in a designated collection and its sub-collections, such as new, deleted, modified, copied, or moved content items or collections. The end-user software can be a separate software application, can integrate with an existing content management application in the operating system, or some combination thereof. In one example of end-user software that integrates with an existing content management application, an end-user can manipulate content items directly in a local collection, while a background process monitors the local collection for changes and synchronizes those changes to content management system 106. Conversely, the background process can identify content items that have been updated at content management system 106 and synchronize those changes to the local collection. The end-user software can provide notifications of synchronization operations, and can provide indications of content statuses directly within the content management application. Sometimes end-user device 102-X may not have a network connection available. In this scenario, the end-user software can monitor the linked collection for content item changes and queue those changes for later synchronization to content management system 106 when a network connection is available. Similarly, an end-user can manually start, stop, pause, or resume synchronization with content management system 106.

An end-user can view or manipulate content via a web interface generated and served by user interface module 122. For example, the end-user can navigate in a web browser to a web address provided by content management system 106. Changes or updates to content in the content storage 160 made through the web interface, such as uploading a new version of a content item, can be propagated back to other end-user devices 102 associated with the end-user's account. For example, multiple end-user devices 102, each with their own end-user software, can be associated with a single account and content items in the account can be synchronized between each of the multiple end-user devices 102.

Content management system 106 can include a communications interface 120 for interfacing with various end-user devices 102, and can interact with other content and/or service providers 109-1, 109-2, . . . 109-N (collectively "109") via an Application Program Interface (API). Certain software applications can access content storage 160 via the API on behalf of an end-user. For example, a software package, such as an app running on a smartphone or tablet computing device, can programmatically make calls directly to content management system 106, when an end-user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific end-user devices, and so forth, to ensure only authorized end-users can access content items. Further, content management system 106 can include analytics module 134 module that can monitor aggregate file operations, end-user actions, network usage, total storage space used, as well as other technology, usage, or business metrics. A privacy and/or security policy (e.g., anonymization) can prevent unauthorized access to end-user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more end-user accounts so that each end-user account has access to the content item. The sharing can be performed in a platform agnostic manner. That is, the content can be shared across multiple end-user devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include an end-user account identifier that identifies the end-user account that has access to the content item. In some embodiments, multiple end-user account identifiers can be associated with a single content entry indicating that the content item has shared access by the multiple user accounts.

To share a content item privately, sharing module 130 can be configured to add an end-user account identifier to the content entry associated with the content item, thus granting the added end-user account access to the content item. Sharing module 130 can also be configured to remove end-user account identifiers from a content entry to restrict an end-user account's access to the content item.

To share content publicly, sharing module 130 can be configured to generate a custom network address, such as a uniform resource locator (URL), or a globally unique or probabilistically unique portion thereof, which allows a web browser to access the content in content management system 106 without authentication. To accomplish this, sharing module 130 can be configured to include content identification data (e.g., the globally unique or probabilistically unique portion) in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows an end-user to restrict access to the shared content item without having to move the content item or delete the generated URL. Likewise, sharing module 130 can reactivate the URL by again changing the value of the URL active flag to 1 or true. An end-user can thus easily restore access to the content item without the need to generate a new URL.

Content Suggestion Module

Content management system 106 may include content suggestion module 135 for suggesting content to end-users. Content suggestion module 135 may generate and provide to an end-user a personalized set of one or more suggested content items that the end-user might be interested in as determined by content suggestion module 135. Here, "personalized" means that the set of suggested content item(s) is selected specifically for the end-user (or the end-user's account).

The personalized set of suggested content item(s) may be provided over network 104 from content suggestion module 135 to an end-user in a user interface presented at the end-user's computing device 102-X via an end-user application such as a web browser installed at the end-user's computing device 102-X. However, the personalized set of suggested content item(s) may be provided via other types of end-user applications such as, for example, a text messaging application, an electronic mail application, or other suitable end-user application capable of presenting the set of suggestion content item(s) to the end-user.

No particular user interface arrangement for presenting the personalized set of suggested content item(s) to the end-user is required. For example, the user interface arrangement may include a "suggested for you" section or the like that displays or otherwise presents the personalized set of suggested content item(s) that the end-user might be interested in. For example, the section may appear on a home web page or the like presented to the end-user at the end-user's computing device 102-X after the end-user successfully authenticates to content management system 106 via authenticator module 126.

Content suggestion module 135 may generate the personalized set of suggested content item(s) based on the end-user's account activity with content management system 106 such as, for example, but not limited to, the end-user's content item sharing activity via sharing module 130 or the end-user's other content item interaction activity via other modules of content suggestion module 135. Such other end-user content item interaction activity may include, but is not limited to, viewing a content item, editing a content item, clicking-through to a content item (e.g., from search results or from a content suggestion), downloading a content item, or liking or favoriting a content item (e.g., in a content item feed).

A goal of generating the personalized set of suggested content item(s) may be to make it easier for the end-user to find relevant content using content management system 106, including content that the end-user might want to access immediately, as opposed to requiring the end-user to keyword search or browse for the content that the end-user wishes to access immediately. In some embodiments, the personalized set of suggested content item(s) only includes content items that the end-user has access to in content management system 106 which may include content items that the end-user owns (e.g., content items that the end-user uploaded to or synchronized to content management system 106) and content items hosted with content management system 106 that are shared with the end-user by other end-users via sharing module 130.

Example Content Suggestion

Figure 2:
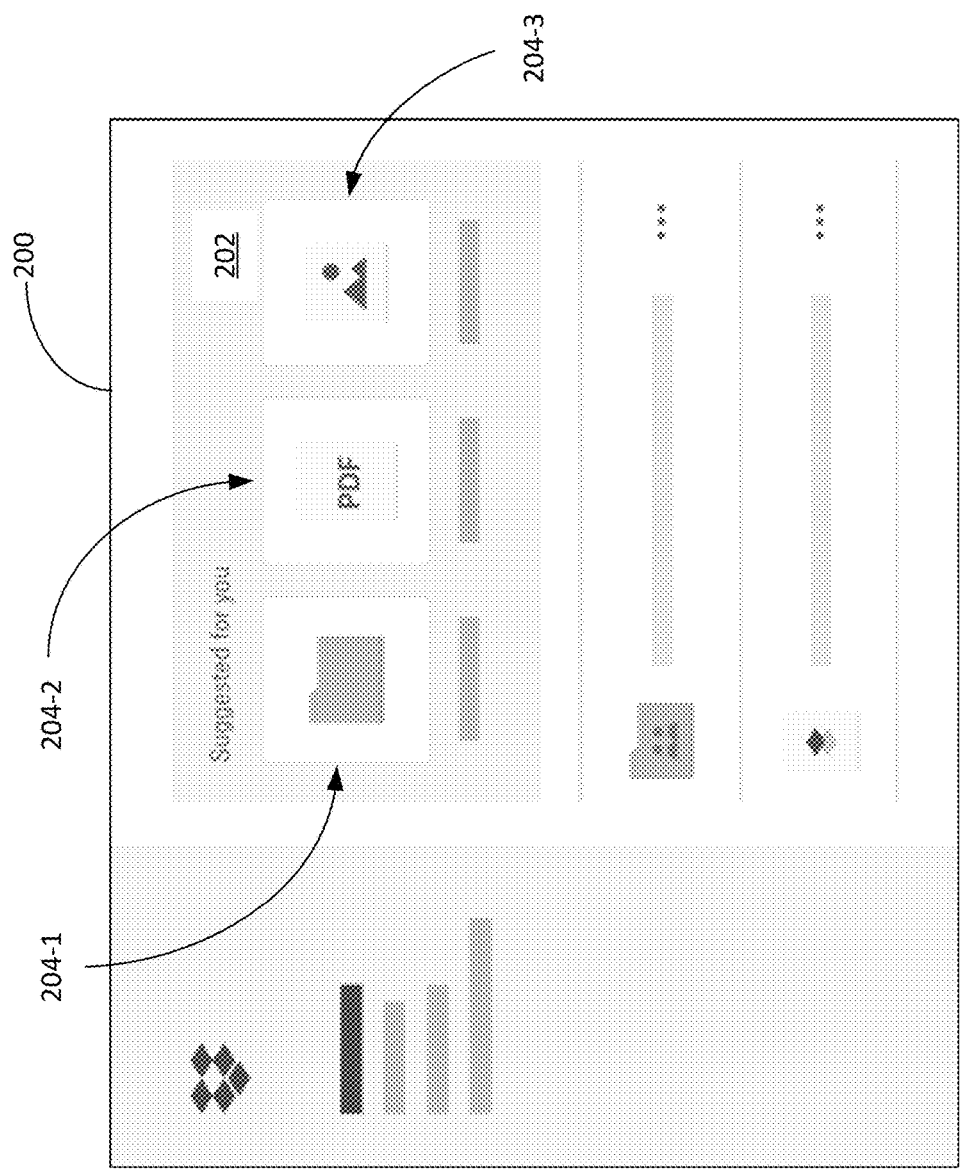
FIG. 2 depicts a graphical user interface that presents personalized content suggestions, according to some embodiments.

FIG. 2 depicts example graphical user interface (GUI) 200 that presents personalized content suggestions, according to some embodiments. GUI 200 may be presented to an end-user via a web browser application, a desktop application, or other end-user application. As shown, GUI 200 includes "suggested for you" section 202 that presents personalized content item suggestions. Section 202 is displayed in a conspicuous location in GUI 200 such that section 202 is easily noticed or easily attracts the attention of the end-user. In this example, section 202 is displayed closer to the top and center of GUI 200, but could be displayed conspicuously in other locations or in other manners such as, for example, as part of a computer animation, in a pop-up notification, in a model window overlay to GUI 200, or other conspicuous presentation. In this example, there are three suggested content items 204-1, 204-2, and 204-3 (collectively "204"). However, as few as one and more then three content items could be suggested.

In this example, suggested content items 204 are of disparate content types. In particular, suggested content item 204-1 is a folder type while content items 204-2 and 204-3 are different file types (e.g., suggested content item 204-2 is an Adobe PDF™ file and suggested content item 204-3 is a digital image file). Each of suggested content items 204 includes a thumbnail image or other graphic or icon representing the corresponding content item and may also include other information such as a name or identifier of the corresponding content item. Suggested content items 204 may also each be interactive such that an end-user selection (e.g., via a touchscreen, pointing device, or other user input mechanism) clicks-through to presentation, retrieval, or download of content of the selected content item itself.

Suggested content items 204 may be of disparate content types and scored for relevancy according to different machine learning sub-models. For example, relevancy scores for suggested content item 204-1 may be computed according to a first machine learning sub-model trained to score folder-type content items. Relevancy scores for suggested content items 204-2 and 204-3 may be computed according to a second machine learning sub-model trained to score file-type content items. The first and second sub-models may be trained differently based on different sets of training examples using different machine learning feature sets resulting in different model parameters. Furthermore, the first and second sub-models may have different configurations including different hyperparameter configurations. As a result, the relevancy scores computed by the first and second sub-models may not be comparable to one another for the purposes of ranking all content items 204 together.

According to some embodiments, techniques disclosed herein may be used to normalize the relevancy scores computed by the first and second sub-models as expected end-user interaction scores for the suggested content items 204 such that suggested content items 204 can be ranked together. For example, suggested content item 204-1 may have the best expected end-user interaction score, suggested content item 204-2 may have the next best expected end-user interaction score, and suggested content item 204-3 may have the next best expected end-user interaction score after suggested content item 204-2. While in this example suggested content items 204 are presented in rank order of expected end-user interaction scores from left to right in GUI 200, suggested content items 204 could be presented in the rank order in other sequences such as, for example, from right to left or from top to bottom in GUI 200 or other suitable arrangement in GUI 200 that indicates the rank order of suggested content items 204 to the end-user.

While in the example of FIG. 2 there are two distinct machine learning sub-models corresponding to two disparate content types, a personalized content suggestion may involve more than two distinct machine learning sub-models and more than two disparate content types. For example, another type of content might be cloud documents (e.g., Google Docs™ documents, Google Sheets™ documents, Google Slides™ documents, Dropbox Paper™ documents, or the like) and a third machine learning sub-model may be used to compute relevancy scores for cloud documents. In this case, techniques disclosed herein may be used to normalize the relevancy scores computed by the first, second, and third sub-models for purposes of ranking content items of disparate content types together. More generally, techniques disclosed herein for cross-model score normalization may be applied to different sets of machine learning sub-models and different sets of disparate content types and no particular set of machine learning sub-models and no particular set of disparate content types is required. The examples provided herein encompass three machine learning sub-models for corresponding file, folder, and cloud document content types. However, the techniques should not be viewed as limited to those machine learning sub-models or those content types.

Bringing Sub-Models Together in a Content Suggestion

Individual machine learning sub-models may be generated and trained to compute relevancy scores for different types of content items where the computed relevancy scores are not practicably comparable for ranking purposes across the individual sub-models. A technical challenge, then, is to meaningfully rank content item suggestions across individual machine learning sub-models against one another. According to some embodiments, the relevancy scores generated by the individual machine learning sub-models are each modeled as a blackbox function having the following properties:

There exists a function $f$ that maps a relevancy score generated by the sub-model for a content item to an expected end-user interaction score for the content item, and The function $f$ is monotonic and continuous.

According to some embodiments, the function $f$ is assumed to be defined by a cubic spline that allows for a discretized representation of the function $f$. While function $f$ is assumed to be defined by a cubic spline in some embodiments, function $f$ may be assumed to be defined by another type of spline or other function defined piecewise by polynomials in other embodiments. For example, a higher-order spline can be used for the representation of function $f$. Nonetheless, a cubic spline may effectively balance the competing goals of representing the function $f$ well and the goal of easily expressing constraints or optimizations on the function $f$ in terms of discretized variables.

Sub-Model Datasets

Sub-model datasets 170 may encompass one sub-model dataset for each machine learning sub-model used to score content items for relevancy. A sub-model dataset may encompass pairs of relevancy scores and end-user interaction indicator variables (labels) for content items scored for relevancy by the sub-model. Content suggestion module 135 may record sub-model datasets 170 in one or more computer storage media in conjunction with sub-models scoring content items for relevancy for purposes of providing content suggestions to end-users.

Figure 3:
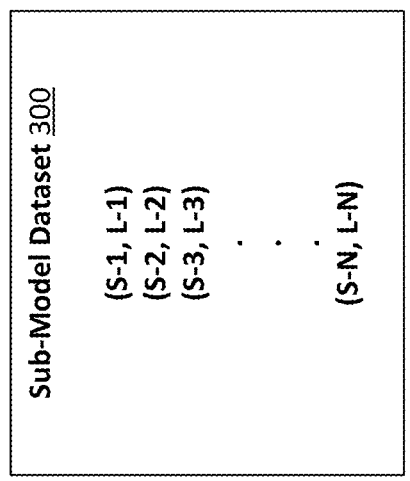
FIG. 3 depicts a sub-model dataset, according to some embodiments.

FIG. 3 depicts sub-model dataset 300 for an individual sub-model that encompasses pairs of scores and labels. Each pair encompasses a relevancy score S-X computed for a corresponding content item by the individual sub-model as part of a corresponding scoring instance. For example, the scoring instance may occur in context of generating a personalized set of suggested content item(s) for a particular end-user. Dataset 300 may encompass multiple scoring instances of the scoring the same content item by the individual sub-model. However, it is also allowable for each pair in dataset 300 to corresponding to a different content item. All content items scored by the individual sub-model corresponding to the pairs of dataset 300 may be of a same content type. For example, the individual sub-model may score just file-type content items, just folder-type content items, or just cloud document-type content items.

As mentioned, each pair in dataset 300 may correspond to an actual scoring instance by the individual sub-model for a corresponding content item. The pairs in dataset 300 may encompass scoring instances by the individual sub-model over a period of time such as a period of days, weeks, months, or years. Thus, dataset 300 may encompass hundreds, thousands, millions, billions of pairs or more depending on the length of the period of time and the number of personalized content suggestions made during that period of time. The pairs in dataset 300 may encompass scoring instances by the individual sub-model for different end-users of content management system 106. According to some embodiments, the pairs in dataset 300 encompass scoring instances by the individual sub-model for different content items and different end-users in the context of making personalized content suggestions to the end-users.

As mentioned, each pair encompasses a relevancy score S-X computed for a corresponding content item by the individual model. In addition, each pair encompasses an end-user interaction indicator variable or label L-X for the corresponding content item. The label L-X of a pair in dataset 300 may reflect the actual level of interaction by the end-user with the corresponding content item according to an end-user interaction model. In particular, a given pair (S-X, L-X) in dataset 300 may correspond to a scoring instance of a corresponding content item CI-X. The content item CI-X may have been selected to be presented to a particular end-user associated with the scoring instance as a personalized content suggestion to the particular end-user. For example, the content item CI-X may have been selected to be presented in the personalized content suggestion based directly on the relevancy score S-X or indirectly based on an expected end-user interaction score to which the relevancy score S-X is mapped according to techniques disclosed herein.

The label L-X may numerically reflect how the particular end-user responded to presentation of the content item CI-X as part of the personalized content suggestion. For example, the label L-X may be a binary label with a value of one (1) if the particular end-user clicked-on or otherwise actively interacted with the suggestion of the content item CI-X, or a value of zero (0) if the particular end-user did not click-on or otherwise ignored the suggestion of the content item CI-X.

Other end-user interaction models are possible and the techniques are not limited to a binary model or any particular end-user interaction model. For example, a multiclass end-user interaction model is possible. For example, a label L-X of zero (0) may represent that the suggested content item CI-X did not receive a click, a label L-X of one (1) (or other number greater than zero) may represent that the suggested content item CI-X received a short click, and a label L-X of two (2) (or other number greater than the number that represents a short click) may represent that the suggested content item CI-X received a long click. Determining whether a short click and a long click occurred can be based on the dwell time on a presentation of content item CI-X by the end-user after the particular end-user selected (clicked-on) the suggested content item CI-X.

Other multiclass models are possible. For example, the label L-X value may be based on the quality of the end-user interaction the particular end user takes on the content item CI-X after selecting the suggested content item CI-X. For example, a label L-X greater than zero may represent that the particular end-user simply viewed the content item CI-X after selecting it as a suggestion. A label L-X greater than that label value may represent that the particular end-user edited the content item CI-X after selecting it as a suggestion. A label L-X still greater than the edit label value may represent that the particular end-user interacted with the content item CI-X in a way that has downstream effects on other end-users of content management system 106 such as, for example, by commenting on, liking, favoriting, or sharing the content item CI-X with other end-user(s).

Solving for a Normalizing Mapping Function

According to some embodiments, the techniques disclosed herein treat the sub-models as "blackbox" content scoring functions. For each distinct sub-model, a normalizing mapping function is solved for that maps the relevancy scores generated by the sub-model for the candidate content to expected end-user interaction scores for the candidate content. The expected end-user interaction scores are comparable across the distinct sub-models and can be used to rank content suggestions across the distinct sub-models.

Figure 4:
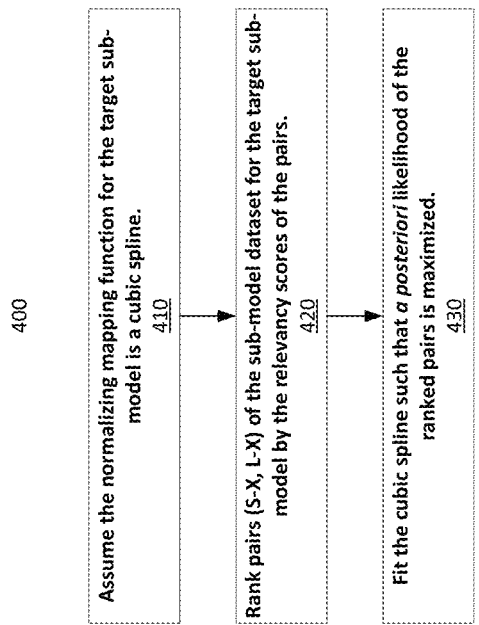
FIG. 4 is a flowchart of a computer-implemented process for solving for a normalizing mapping function, according to some embodiments.

According to some embodiments, the normalizing mapping functions solved for are represented as cubic splines that allow for discrete representations of the normalizing mapping functions. FIG. 4 is a flowchart of process 400 for solving for a normalizing mapping function for a target machine learning sub-model for which a sub-model dataset (e.g., 300) is available. At operation 410, the normalizing mapping function $f$ for the target sub-model is assumed to be a cubic spline or other function defined piecewise by polynomials. At operation 420, pairs of the sub-model dataset for the target sub-model are ranked in order of the relevancy scores of the pairs. At operation 430, the cubic spline normalizing mapping function $f$ for the target sub-model is fit such that the a posteriori likelihood of the ranked pairs is maximized. In particular, given a sequence of the ranked pairs $(S_i, L_i)$ where $S_i$ is the relevancy score computed by the target sub-model for a content item corresponding to pair i and $L_i$ is the end-user interaction label for the content item corresponding to pair i, the log-likelihood of the sequence may be represented as:

$$\sum_{i=1}^{N} L_i \cdot \log f(S_i) + (1 - L_i) \cdot (1 - \log f(S_i))$$

In the above representation, the parameter N represents the number of pairs in the sequence. The spline parameters of function $f$ recovered at operation 430 maximize this log-likelihood. To discretize the problem of solving for the normalizing mapping function $f$ at operation 430, the normalizing mapping function may be sampled along a distribution of raw scores. Process 400 may be performed for other sub-models based on their respective sub-model datasets to solve for normalizing mapping functions for each of the sub-models.

Technical Details

As mentioned, different machine learning models (sub-models) may be used in a content management system to generate relevancy scores for content items. The relevancy scores for content items from a sub-model may be used to rank the content items scored by that sub-model in order of the relevancy scores. Unfortunately, relevancy scores from different sub-models may not be comparable for the purpose of producing a meaningful ranking of content items based on the relevancy scores, even where the different sub-models each score the same set of content items.

A technical solution is provided herein to normalize relevancy scores for content items from different sub-models such that the normalized relevancy scores are comparable for ranking purposes. The technical solution has a benefit that the different sub-models do not need to be re-learned and the learning of the different sub-models do not need to be specially constrained. This benefit improves the operation of content management systems that employ the technical solution because computing resources (e.g., processor, networking, and storage resources) are conserved by not having to re-learn the sub-models or otherwise specially constrain the learning of the sub-models. Instead, the sub-models that were used to score content items before an implementation of the technical solution can continue to be used after the implementation without modification. Thus, the technical solution may be viewed as a non-destructive augmentation to a collection of sub-models used to compute relevancy scores for different types of content items for purposes of making personalized content suggestions.

While in some embodiments the sub-models are not re-learned or specially constrained, the sub-models may be re-learned or be specially constrained according to the requirements of the particular implementation at hand. Thus, an implementation of the technical solution does not require that the sub-models to which the technical solution is applied remain unmodified.

The Setup

According to some embodiments, the technical solution maps relevancy scores for content items computed by a sub-model to probabilities of end-user interaction with the content items in the form of expected end-user interaction scores (sometimes referred to herein as "expected EIS".) As used herein, an end-user interaction with a content item refers to an interaction with the content item by the end-user using a content management system. For example, an end-user interaction may encompass a presentation of the content item in a user interface at the end-user's computing device or encompass a user input directed to a presentation of the content item at the end-user's computing device. No particular type of end-user interaction is required of the technical solution and end-user interaction with a content item may encompass such activities as viewing, editing, downloading, commenting on, liking, favoriting, or sharing the content item using the content management system.

Assume $M_1, M_2, \ldots$ are machine learning sub-models trained using machine learning techniques (e.g., supervised machine learning techniques) such that machine learning sub-model $M_i: X \rightarrow \mathbb{R}$ where X is a domain of content items. Each machine learning sub-model $M_i$ may generate relevancy scores for content items in X, and the relevancy scores may be real numbers (represented as floating point numbers in a computer) such as, for example, a score greater than or equal to zero with values closer to zero indicating less relevancy and values farther from zero indicating greater relevancy.

For each machine learning sub-model $M_i$, there exists a set of content item scoring instances $\{x_{i,j}|j=1, 2, \ldots, n_i\}$. Here, the parameter $n_i$ is the cardinality of the set of content item scoring instances for model $M_i$. The set of content item scoring instances for model $M_i$ may have a corresponding set of end-user interaction labels $\{y_{i,j}|j=1, 2, \ldots, n_i\}$, respectively.

An end-user interaction label $y_{i,j}$ may be a numerical value such as an integer or real number (floating point number) reflecting how an end-user actually interacted with a suggestion of the content item scored by sub-model $M_i$ in the corresponding content item scoring instance $x_{i,j}$ after the content item was presented as a content suggestion to the end-user. For example, an end-user interaction label $y_{i,j}$ can be a numerical value greater than or equal to zero with values closer to zero indicating no or less qualitative interaction with the content item by the end-user when presented to the end-user as a content suggestion and with values farther from zero indicating more or greater qualitative interaction with the content item by the end-user when presented to the end-user as a content suggestion.

As indicated above, the quality of the interaction with the content item by the end-user when presented as a content suggestion can be based on all of the following detectable signals in the content management system, a subset of these detectable signals, or a superset of a subset of these detectable signals:

Whether the end-user did or did not click-on (click-through) the content suggestion, If the end-user clicked-on (clicked-through) the content suggestion, how long the end-user dwelled on (viewed) the content item or portion thereof presented to the end-user after clicking-on (clicking-through) the content suggestion, If the end-user clicked-on (clicked-through) the content suggestion, whether the end-user then edited the content item or portion thereof presented to the end-user after clicking-on (clicking-through) the content suggestion, If the end-user clicked-on (clicked-through) the content suggestion, whether the end-user then commented on the content item or portion thereof presented to the end-user after clicking-on (clicking-through) the content suggestion, If the end-user clicked-on (clicked-through) the content suggestion, whether the end-user then favorited or liked the content item or portion thereof presented to the end-user after clicking-on (clicking-through) the content suggestion, and If the end-user clicked-on (clicked-through) the content suggestion, whether the end-user shared the content item with one or more other end-users of the content management system.

It should be noted that a content suggestion may include user interface controls for performing some of the above-listed end-user interactions directly without having to first click-on (click-through) the content suggestion. For example, a content suggestion could provide user interface controls for commenting on, favoriting, liking, or sharing the content item. In this case, selecting the user interface controls may considered a click on the suggested content item and also considered as the end-user making the end-user interaction associated with the selected user interface controls with the content item. For example, if the end-user selects a like or favorite icon associated with the content suggestion, then the selection of the like or favorite icon may be considered both a click on the suggested content item and a like or favorite of the suggested content item. If the end-user selects sharing controls associated with the content suggestion and completes a sharing operation involving sharing the content item with one or more other end-users of the content management system, then the selection of the sharing controls may be considered both a click on the suggested content item and a share of the suggested content item. However, if the end-user selects the sharing controls but does not complete the sharing operation (e.g., abandons the operation), then the selection of the sharing controls may be considered a click on the suggested content item but might not be considered a share of the suggested content item.

According to some embodiments, a goal of the technical solution is to obtain, for each machine learning sub-model $M_i$, a normalizing mapping function $f_i: \mathbb{R} \to \mathbb{R}$ such that $f_i \circ M_i$ ($f_i$ composed of $M_i$) is comparable across all of the machine learning sub-models.

A normalizing mapping function $f_i$ may be monotonic with respect to machine learning sub-model $M_i$. In other words, a normalizing mapping function $f_i$ for a machine learning sub-model $M_i$ may not change the ranking that machine learning sub-model $M_i$ generates over a set of content items. However, normalizing mapping functions for the machine learning sub-models may not be monotonic across the machine learning sub-models. For example, it is possible for two machine learning sub-models to score the same set of content items in different orders. While the respective normalizing mapping functions may preserve the respective rank order of the content items generated by the respective machine learning sub-models, additional logic may be needed to resolve the final rank order of the set of content items such as logic for ranking the set of content items by the respective expected end-user interaction scores generated by the normalizing mapping functions.

A goal of the technical solution may be to determine a normalizing mapping function $f_i$ for a machine learning sub-model $M_i$ such that $f_i \circ M_i$ can provide a probability that the label for a given content item is positive. For example, the output of $f_i$ can be a real number in [0, 1].

Generating a Normalizing Mapping Function for a Target Machine Learning Sub-Model An approach for generating a normalizing mapping function $f$ for a target machine learning sub-model M for scoring content items will now be described, according to some embodiments. In this case, it is assumed that the sub-model M has scored a set of content item scoring instances $\{x_i\}$ and a corresponding set of relevancy scores $\{M(x_i)\}$ generated by the model M are available (e.g., from scoring logs) and a corresponding set of end-user interaction labels $\{y_i\}$ are available for the set of content item scoring instances $\{x_i\}$ (e.g., based on end-user interaction logs (e.g., click-through logs) for the set of content item scoring instances).

A goal of the technical solution may be to parameterize $f$, since it may be an unknown continuous function. Accordingly, in some embodiments, it is assumed that $f$ is a piecewise linear function with K number of pieces. The approach may then choose K+1 values at which $f$ is defined. In particular, the approach may examine the set $\{M(x_i)|j\}$, consider its cumulative distribution function (CDF), and sample the CDF at K+1 equidistant values from 0 and 1. Assume these equidistant values are represented by $m_0, \ldots, m_K$. It should be noted that $m_0$ (e.g., $$\min_j M(x_j))$$

is the $0^{th}$ percentile, $m_K$ (i.e.

$$\min_j M(x_j))$$

is the $100^{th}$ percentile, and $m_{K/2}$ is the median, and so on. By sampling this way, it may be ensured that for any output of M, there are nearby points at which $f$ is defined.

Formally, the approach assumes there exists $\{\hat{f}_k | k=0, \ldots, K\}$ that determines $f$ entirely, such that:

$f: m_k \mapsto \hat{f}_k$ exactly; and $f: x \mapsto (1-w)\hat{f}_k + w\widetilde{f_{k+1}}$ for $x \in [m_k, m_{k+1})$ where w is the interpolating weight for x relative to the interval such as, for example, $$W = \frac{x - m_k}{m_{k+1} - m_k}.$$

Figure 5:
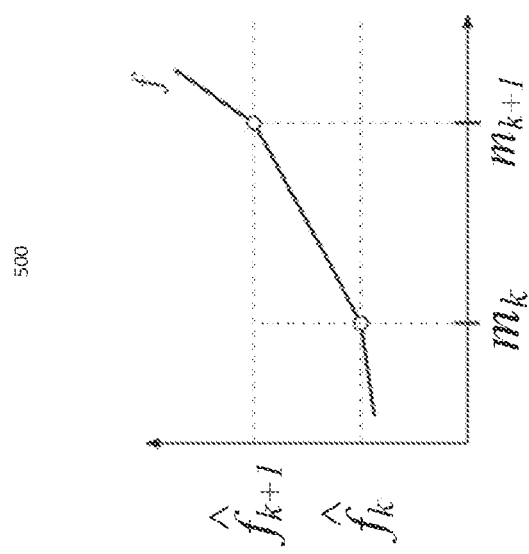
FIG. 5 is a graph of a portion of a piecewise normalizing mapping function with K number of pieces, according to some embodiments.

FIG. 5 illustrates how the choice of $\{\hat{f}_k | k\}$ may determine $f$ entirely, according to some embodiments.

According to some embodiments, the K number of pieces ranges between ten (10) and fifty (50) for a sub-model dataset having at least ten thousand (10,000) or so pairs of relevancy scores and end-user interaction labels. Values of K higher than fifty (50) may require more sub-model pairs in order to estimate the function $f$ accurately. In other words, since the function $f$ is parameterized by K+1 values, estimating each of the K+1 values may require a number of samples. Consequently, the total number of samples needed to accurately parameterize the function $f$ increases as K increases.

According to some embodiments, the function $f$ is estimated at the K+1 points with an accuracy up to a number of decimal points such as, for example, at least three (3) decimal points. This accuracy is selected based on the expected end-user interaction scores having a single or double-digit percentage value. In this case, each of the equidistant values $m_k$ samples may have approximately 1,000 samples. Thus, if a given sub-model dataset comprises, for example, 10,000 pairs relevancy scores and end-user interaction labels, then K may be selected as ten (10) or approximately ten (10) as sufficient to accurately parameterize the function $f$. If the given sub-model dataset comprises even more pairs (e.g., 100,000), then K may be higher then ten (10). Note, however, that too high of a value for K may have diminishing returns where the function $f$ can be sufficiently approximated with a spline with fewer control points. Thus, the parameter K may be selected according to the requirements of the particular implementation at hand including how many pairs of relevancy scores and end-user interaction labels are available in the given sub-model dataset.

The approach may assume that each end-user interaction label $\{y_j\}$ is independent, and follows a Bernoulli distribution given by $f(x_j)$. Given this, the likelihood of observing the given set of end-user interaction labels may represented as:

$P(y_j|f) = f(x_j)^{y_j}(1-f(x_j))^{1-y_j}$; and $P(\{y_j|f\}|f) = \Pi_j f(x_j)^{y_j}(1-f(x_j))^{1-y_j}.$ Expanding the above in terms of the variables that determine $f$, there is:

$P(\{y_j|j\}|\{\hat{f}_k|k\}) \propto \Pi_j((1-w)\widetilde{f_{k_j}} + w_j\widetilde{f_{k_j+1}})^{y_j}$
$(1-\ldots)^{1-y_j},$ In the above equation, $k_j$ may represent the index of the interval in which $x_j$ lies. And $w_j$ represents the interpolating weight.

Taking the above equation as a log-likelihood, there is:

$\log P(\{y_j|j\}|\{\hat{f}_k|k\}) \propto \Sigma_j y_j \log((1-w_j)\widetilde{f_{k_j}} + w_j\widetilde{f_{k_j+1}}) +$
$(1-y_j)\log(1-\ldots).$ With this, the approach may maximize the log-likelihood probability following the monotonicity constraint using an optimizer such as, for example, a Tensorflow solver.

Example Tensorflow Implementation

A normalizing mapping function $f$ may follow a couple of conditions. First, $0 <= f(x) <= 1$. Second, $f$ should be monotonic.

These two conditions can be represented as:

$\hat{f}_k = \rho_{j=0}^{k} \sigma(\widehat{g_k})$ for unknowns $\widehat{g_k}$. Here, $\sigma$ may represent a sigmoid function. It should be noted that with this representation $\hat{f}_k$ is monotonic, and is greater than 0.

It should also be noted that $\hat{f}_k$ is not necessary less than or equal to 1 as that may make observing negative samples less probable. Nonetheless, the optimizer may penalize $\hat{f}_k$ for being close to 1.

The a posteriori probability above can be represented in terms of $\widehat{g_k}$ and the optimizer implemented using Tensorflow as in the following example Python code portion:

```
01: #index is k_j above.
02: #weight is w_j above.
03: #is_positive is y_j above.
04: g=tf.Variable( ... ) #initialize to something reasonable,
    of size equal to the dataset.
05: f=tf.nn.sigmoid(tf.cumsum(tf.concat((g[0:1], tf.exp(g
    [1:])), axis=0)))
06: interpolant=tf.gather(f, index)*(np.ones_like(weight)–
    weight)+tf.gather(f, index+1)*weight
07: loss=–tf.reduce_sum(is_positive*tf.log(interpolant)+
    (1.0–is_positive)*tf.log(1.0–interpolant))
```

Tensorflow Implementation Details

A more detailed description of a possible Tensorflow implementation will now be provided using a code example in the Python programming language.

```
01: def normalize_model_scores(
02: model_scores_and_labels, #type: Sequence[Tuple[float,
    bool]]
03: n_pieces=25, #type: int
04: spacing=1.0, #type: float
05: n_iter=20000, #type: int
06:): #type: ( ... )→Sequence[Tuple[float, float]]
```

The normalize_model_scores function, given a labeled dataset consisting of the sub-model's relevancy scores and end-user interaction labels, return parameters for a monotonic function that can be used to normalize the sub-model scores. The return value will be a (sorted) sequence of input and output values for the Bayesian-optimal piecewise-linear function. The input values will be chosen along the CDF of the observed scores, on a log-scale. That is, more samples will be picked near the 99%-ile than at the 1%-ile. This is because in practice lower scores correspond to noise, for which estimating them accurately matters little. The dataset may be subsampled to improve the processing latency of the function.

The parameters of the normalize_model_scores function above may be as follows:

model_scores_and_labels may be a sequence of (relevancy score, end-user interaction label) pairs.

n_pieces may be the desired number of samples for modeling the probability function.

spacing may be a constant determining the spacing of the samples. The samples may be spaced evenly in log-space along the CDF, using this constant in the arithmetic involved; the higher this is, the more pronounced the effect of log-space and the more samples there may be at the higher end of the value-often this makes sense because lower scores correspond to noisy inputs.

n_iter may the desired number of iterations for running the optimization.

The function may sort the input model scores and labels by the model scores as in:

07: model_scores_and_labels=sorted(model_scores_and_labels)
08: scores, labels=zip(*model_scores_and_labels)

The normalize_model_scores function may sample the sub-model scores so that the samples are "evenly" spaced in some sense. For example, a log-scale on the CDF of the scores may be used. That is, [0.0, 1.0] in the range of the CDF may be partitioned such that there are more samples near 1.0, leveraging the log-scale. For example, the function may include the following computations:

09: quantiles=np.exp(-spacing*np.linspace(0.0, 1.0, n_pieces+1))
10: quantiles=(quantiles-quantiles[0])/(quantiles[-1]-quantiles[0])
11: samples=np.quantile(scores, quantiles)

The normalize_model_scores function may remove duplicate samples to avoid degenerate intervals as in:

12: samples_unique=np.unique(samples)

The normalize_model_scores function may find quantiles that correspond to the unique sample as in:

13: quantiles=quantiles[[np.where(samples==s)[0] [0] for s in samples unique]]
14: samples=samples unique The normalize_model_scores function may compute the interval to which each score belongs and compute the interpolating weight as in:

15: cursor=0 #will be used to index into the intervals.
16: indices=[ ] #type: List[float]
17: weights=[ ] #type: List[float]
18: for score, label in model_scores_and_labels:
19: while score>=samples[cursor+1] and cursor+2<len (samples):
20: cursor+=1
21: try:
22: weight=(score-samples[cursor])/(samples[cursor+1]-samples[cursor])
23: except ZeroDivisionError:
24: weight=0.0
25: indices.append(cursor)
26: weights.append(weight)

The normalize_model_scores function may solve for the values of the piecewise linear normalizing mapping function $f$ at the sample points. In order to enforce that $f$ is monotonic and so that $0<=f(x)<=1$, the function may define a proxy fee variable g such that, $f(samples[0])=sigmoid(g[0])$, $f(samples[k])=sigmoid(g[0])+\ldots+sigmoid(g[k])+M[k]$ for k>0. The normalize_model_scores function may set M[1], . . . , M[k] to ensure that $f$ has a minimal slope everywhere. In some embodiments, the normalize_model_scores function picks M[k] to be the %-ile rank of samples [k], scaled by MIN_SLOPE. By doing so, the normalize_model_scores function may structurally guarantee the $f$ is monotonic and that $0<=f(x)$, except for $f<=1$. This exception may be obtained by the optimization within an allowable error.

27: with tf.Session(graph=tf.Graph( )) as session:
28: positive_rate=np.mean([1.0 if label else 0.0 for label in labels])
29: inv_sigmoid_positive_rate=np.log(positive_rate/(1.0-positive_rate))
30: g_initial=np.concatenate(([inv_sigmoid_positive_rate], np.ones(len(samples)-1)*-10.0))
31: MIN_SLOPE=0.01
32: g=tf.Variable(g_initial)
33: f=tf.cumsum(tf.sigmoid(g))+quantiles*MIN_SLOPE
34: interp=tf.gather(f, indices)*(1.0-np.array(weights))+tf.gather(f, np.array(indices)+1)*np.array(weights)
35: loss=-(tf.reduce_mean(tf.log(interp)*np.array(labels, dtype=np.float32)+tf.log(1.0-interp)*(1.0-np.array(labels, dtype=np.float32))))
36: optimizer=tf.train.AdamOptimizer(1e-2).minimize (loss)
37: tf.global_variables_initializer( ).run( )
38: for_in xrange(n_iter):
39: _, f_val=session.run([optimizer, f])
40: return zip(samples, f_val)

At lines 28-30, the normalize_model_scores function initializes a variable such that f(samples[0], . . . approximately map to the average positive rate using a gentle slope.

At line 31, the normalize_model_scores function initializes a variable to the minimum slope of $f$ when composed with the inverse CDF.

At lines 34 and 35, the normalize_model_scores function assumes that $f$ provides the Bernoulli distribution from which the label is drawn, the log-likelihood of observing labels[i] at scores [i] is then given by, labels[i] log $f$(scores [i])+(1-labels[i]) log (1-f(scores[i])). The normalize_model_scores function rewrites f(sources[i]) as the linear interpolation between f(samples[indices[i])) and f(samples (indices[i]+1)), which enabled the normalize_model_scores function to define the loss as it is in line 35.

At lines 36-39, the Adam optimization algorithm is used. However, other optimization algorithms could be used instead such as, for example, AdaBound or Stochastic Gradient Descent (SGD).

Example Content Suggestion Pipeline

Figure 6:
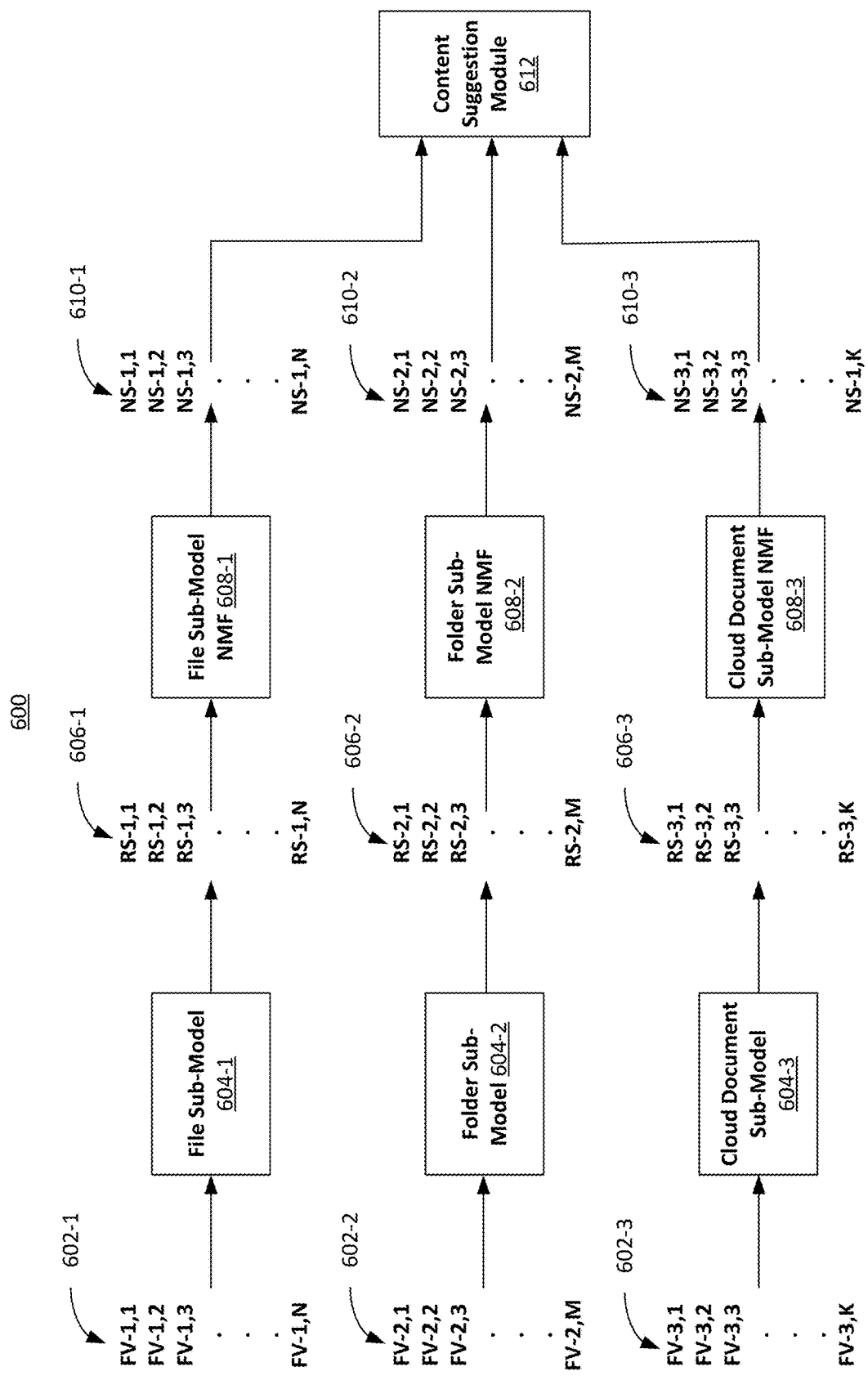
FIG. 6 depicts an example content suggestion pipeline, according to some embodiments.

FIG. 6 depicts example content suggestion pipeline 600, according to some embodiments. Pipeline 600 includes trained machine learning sub-model 604-1 for scoring file-type content items, trained machine learning sub-model 604-2 for scoring folder-type content items, and trained machine learning sub-model 606-2 for scoring cloud document-type content items. For example, each of sub-models 604 can be trained linear support vector machine or a trained neural network or other suitable trained machine learning model. Each of sub-models 604 may be trained in supervised, semi-supervised, or unsupervised manner.

Sub-models 604 are deemed sub-models as subordinate to respective normalizing mapping functions 608. In particular, relevancy scores 606-1 generated by file-type sub-model 604-1 are each mapped to respective expected end-user interaction scores 610-1 by file sub-model normalizing mapping function 608-1. Relevancy scores 606-2 generated by folder-type sub-model 604-2 are each mapped to respective end-user interaction scores 610-2 by folder sub-model normalizing mapping function 608-2. Relevancy scores 606-3 generated by cloud document-type sub-model 604-3 are each mapped to respective end-user interaction scores 610-3 by cloud document sub-model normalizing mapping function 608-3.

File sub-model normalizing mapping function 608-1 may be solved for based on a sub-model dataset encompassing relevancy scores generated by file sub-model 604-1 for file content item scoring instances and corresponding end-user interaction labels for the file content item scoring instances. Folder sub-model normalizing mapping function 608-2 may be solved for based on a sub-model dataset encompassing relevancy scores generated by folder sub-model 604-2 for folder content item scoring instances and corresponding end-user interaction labels for the folder content item scoring instances. Cloud document sub-model normalizing mapping function 608-3 may be solved for based on a sub-model dataset encompassing relevancy scores generated by cloud document sub-model 604-3 for cloud document content item scoring instances and corresponding end-user interaction labels for the cloud document content item scoring instances.

Because of normalizing mapping functions 608, content suggestion module 612 can rank (sort) file, folder, and cloud document content items together in order of their expected end-user interaction scores 610. Content suggestion module 612 can then select the top scoring content items to suggest to end-users. The suggestions can include a mix of file, folder, and cloud document content items.

Trained file machine learning sub-model 604-1 may generate relevancy scores 606-1 based on input file feature vectors 602-1 for file content items scored. The input file feature vectors 602-1 may encode (as vectors of integer or floating point numbers) various signals available in the content management system about the file content items scored. Likewise, trained folder machine learning sub-model 604-2 may generate relevancy scores 606-2 based on input folder feature vectors 602-2 for folder content items scored. The input folder feature vectors 602-2 may encode (as vectors of integer or floating point numbers) various signals available in the content management system about the folder content items scored. Similarly, trained cloud document machine learning sub-model 604-3 may generate relevancy scores 606-3 based on input cloud document feature vectors 602-3 for cloud document content items scored. The input cloud document feature vectors 602-3 may encode (as vectors of integer or floating point numbers) various signals available in the content management system about the cloud document content items scored.

The various signals available in the content management system about a file content item encoded by input file feature vectors 602-1 may include all of the following signals, a subset of these signals, or a superset of a subset of these signals:

How recently the content item is accessed in the content management system,

How frequently the content item is accessed in the content management during a period of time, The content item access history in the content management system include a history of opens, edits, shares, etc. during a period of time, The end-users that have accessed the content item during a period of time, The filename of the content item, The file type of the content item, and The size of the content item.

According to some embodiments, the file type of the content item is encoded as a content type embedding as described in U.S. patent application Ser. No. 16/675,671, filed Nov. 6, 2019, the entire contents of which is hereby incorporated by reference as if fully set forth herein.

The various signals available in the content management system about a folder content item encoded by input folder feature vectors 602-2 may include all of the following signals, a subset of these signals, or a superset of a subset of these signals:

Any of the above file content item signals for file content items contained in the folder, How recently the folder is accessed in the content management system, How frequently the folder is accessed in the content management during a period of time, The folder access history in the content management system include a history of opens, edits, shares, etc. during a period of time, The end-users that have accessed the folder during a period of time, and The folder name of the folder.

The various signals available in the content management system about a cloud document content item encoded by input cloud document feature vectors 602-3 may include all of the following signals, a subset of these signals, or a superset of a subset of these signals:

How recently the cloud document is accessed in the content management system,

How frequently the cloud document is accessed in the content management during a period of time, The cloud document access history in the content management system include a history of opens, edits, shares, comments, etc. during a period of time, The end-users that have accessed the cloud document during a period of time, The title of the cloud document, and The file of cloud document (e.g., word processing document, spreadsheet document, presentation document, etc.).

In addition to the content item-type specific signals, feature vectors 602 may encode various signals about the end-users to which content suggestions are provided. Such end-user signals may include context signals such as the current date and time and the type of end-user computing device (e.g., mobile or desktop). By doing so, content suggestions can be more personalized without having to train separate machine learning sub-models for each end-user. Instead, sub-models 604 may be trained based on end-user interaction activity by a large number of end-users, so as to protect from bias of sub-models 604 toward representing the action or revealing the behavior of any particular end-user. Privacy and access controls may also be enforced in a personalized content suggestion to an end-user such that only content items and signals the end-user has access to and has authorized are involved in the personalized content suggestion.

Computing System Implementation

Some embodiments may encompass performance of a method by a computing system having one or more processors and storage media. The one or more processors and the storage media may be provided by one or more computing devices. An example computing device 700 is described below with respect to FIG. 7. The storage media of the computing system can store one or more computer programs. The one or more programs may include instructions configured to perform the method. The instructions may be executed by the one or more processors to perform the method.

Some embodiments may encompass one or more non-transitory computer-readable media. The one or more non-transitory computer-readable media may store the one or more computer programs that include the instructions configured to perform the method.

Some embodiments may encompass the computing system having the one or more processors and the storage media storing the one or more computer programs that include the instructions configured to perform the method.

Some embodiments may encompass one or more virtual machines that architecturally operate on top of one or more computing devices and emulate computing hardware. A virtual machine can be a Type-1 or Type-2 hypervisor, for example. Operating system virtualization using containers is also possible instead of, or in conjunction with, computing hardware virtualization using hypervisors.

Some embodiments encompass multiple computing devices. The computing devices may be arranged in a distributed, parallel, clustered or other suitable multi-node computing configuration in which computing devices are continuously, periodically, or intermittently interconnected by one or more data communications networks (e.g., one or more Internet Protocol (IP) networks.) Further, it need not be the case that the set of computing devices that execute the instructions be the same set of computing devices that provide the storage media storing the one or more computer programs, and the sets may only partially overlap or may be mutually exclusive. For example, one set of computing devices may store the one or more computer programs from which another, different set of computing devices downloads the one or more computing devices and executes the instructions thereof.

Example Computing Device

Figure 7:
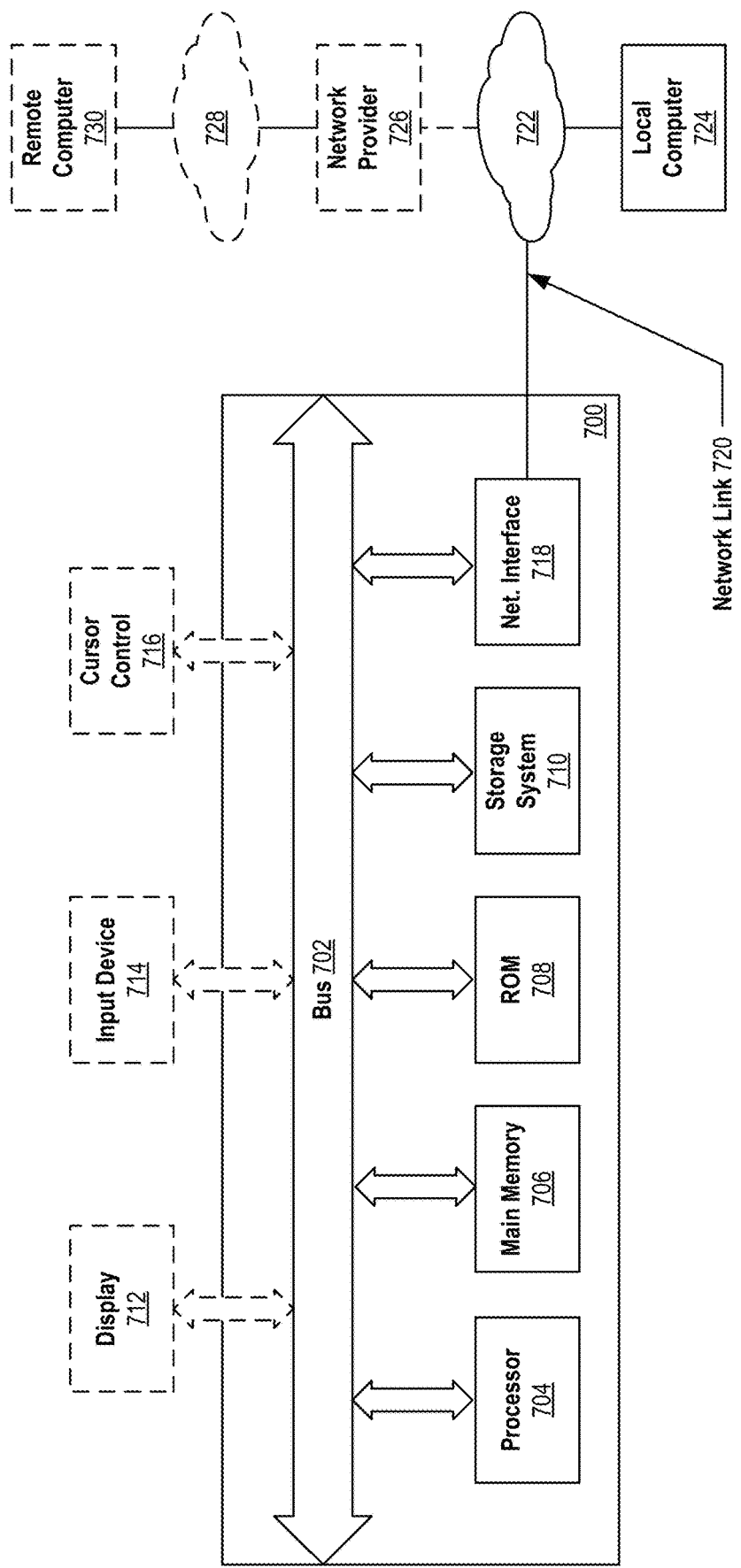
FIG. 7 depicts an example computing device, according to some embodiments.

FIG. 7 depicts example computing device 700, according to some embodiments. Computing device 700 may include bus 702 or other communication mechanism for communicating information, and one or more hardware processors 704 coupled with bus 702 for processing information.

Hardware processor 704 may include, for example, one or more general-purpose microprocessors, central processing units (CPUs) or cores thereof, graphics processing units (GPUs), or systems on a chip (SoCs).

Computing device 700 may also include main memory 706, typically implemented by one or more volatile memory devices, coupled to bus 702 for storing information and instructions to be executed by processor 704. Main memory 706 also may be used for storing temporary variables or other intermediate information during execution of instructions by processor 704.

Computing device 700 may also include read-only memory (ROM) 708 or other static storage device coupled to bus 702 for storing static information and instructions for processor 704.

Storage system 710 implemented by one or more non-volatile memory devices may be provided and coupled to bus 702 for storing information and instructions.

Computing device 700 may be coupled via bus 702 to display 712, such as a liquid crystal display (LCD), a light emitting diode (LED) display, or a cathode ray tube (CRT), for displaying information to a computer user. Display 712 may be combined with a touch sensitive surface to form a touch screen display. The touch sensitive surface may be an input device for communicating information including direction information and command selections to processor 704 and for controlling cursor movement on display 712 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 714, including alphanumeric and other keys, may be coupled to bus 702 for communicating information and command selections to processor 704.

Another type of user input device may be cursor control 716, such as a mouse, a trackball, or cursor direction keys for communicating direction information and command selections to processor 704 and for controlling cursor movement on display 712. This input device may have two degrees of freedom in two axes, a first axis (e.g., x) and a second axis (e.g., y), that allows the device to specify positions in a plane.

Instructions, when stored in non-transitory storage media accessible to processor 704, such as, for example, main memory 706 or storage system 710, may render computing device 700 into a special-purpose machine that is customized to perform the operations specified in the instructions. Alternatively, customized hard-wired logic, one or more ASICs or FPGAs, firmware and/or hardware logic which in combination with the computing device may cause or program computing device 700 to be a special-purpose machine.

A computer-implemented process may be performed by computing device 700 in response to processor 704 executing one or more sequences of one or more instructions contained in main memory 706. Such instructions may be read into main memory 706 from another storage medium, such as storage system 710. Execution of the sequences of instructions contained in main memory 706 may cause processor 704 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 710) and/or volatile media (e.g., main memory 706). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 702. Transmission media can also take the form of acoustic or light waves, such as those generated during radio-wave and infra-red data communications.

Computing device 700 may also include a network interface 718 coupled to bus 702. Network interface 718 may provide a two-way data communication coupling to a wired or wireless network link 720 that is connected to a local, cellular or mobile network 722. For example, communication interface 718 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Communication interface 718 may send and receive electrical, electromagnetic or optical signals that carry digital data streams representing various types of information.

Network link 720 may provide data communication through one or more networks to other data devices. For example, network link 720 may provide a connection through network 722 to local computing device 724 that is also connected to network 722 or to data communication equipment operated by a network access provider 726 such as, for example, an internet service provider or a cellular network provider. Network access provider 726 in turn may provide data communication connectivity to another data communications network 728 (e.g., the internet). Networks 722 and 728 both may use electrical, electromagnetic or optical signals that carry digital data streams. The signals through the various networks and the signals on network link 720 and through communication interface 718, which carry the digital data to and from computing device 700, are example forms of transmission media.

Computing device 700 may send messages and receive data, including program code, through the networks 722 and 728, network link 720 and communication interface 718. In the internet example, a remote computing device 730 may transmit a requested code for an application program through network 728, network 722 and communication interface 718. The received code may be executed by processor 704 as it is received, and/or stored in storage device 710, or other non-volatile storage for later execution.

Conclusion

In the foregoing detailed description, some embodiments have been described with reference to numerous specific details that may vary from implementation to implementation. The detailed description and the figures are, accordingly, to be regarded in an illustrative rather than a restrictive sense.

A reference in the detailed description to some embodiments is not intended to mean that an embodiment is exclusive of another described embodiment, unless the context clearly indicates otherwise. Thus, a described embodiment may be combined with one or more other described embodiments in a particular implementation, unless the context clearly indicates otherwise.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The invention claimed is:

1. One or more non-transitory computer-readable media comprising computer-readable instructions for cross-model score normalization which, when executed by a computing system having one or more processors, cause the computing system to:
generate, based in part on a plurality of end-user interactions for an individual user, a plurality of feature vectors for a plurality of content items, the plurality of feature vectors comprising feature vectors for a first content item of a file-type content item and feature vectors for a second content item of a folder-type content item;
select, based on receiving the feature vectors of the first content item of the file-type content item, a first machine learning model from a plurality of machine learning models to generate a first score, the first machine learning model trained to score the file-type content item;
select, based on receiving the feature vectors of the second content item of the folder-type content item, a second machine learning model from the plurality of machine learning models to generate a second score, the second machine learning model trained to score the folder-type content item;
generate a plurality of expected end-user interaction scores based on the first score and the second score;
select one or more content items of a plurality of content items based on the plurality of expected end-user interaction scores; and
send a content suggestion of the one or more content items to an end-user computing device.

2. The one or more non-transitory computer-readable media of claim 1, wherein the computer-readable instructions are further configured to cause the computing system to:
rank the plurality of content items based on the plurality of expected end-user interaction scores; and
select the one or more content items based on a ranking of the plurality of content items based on the plurality of expected end-user interaction scores.

3. The one or more non-transitory computer-readable media of claim 1, wherein the computer-readable instructions are further configured to cause the computing system to map the first score and the second score generated by the first machine learning model and the second machine learning model to the plurality of expected end-user interaction scores based on a plurality of normalizing mapping functions, each normalizing mapping function, of the plurality of normalizing mapping functions, solved using an optimizer for a respective machine learning model.

4. The one or more non-transitory computer-readable media of claim 1, wherein the plurality of feature vectors further comprises feature vectors of a third content item type for a cloud document.

5. The one or more non-transitory computer-readable media of claim 1, wherein generating the plurality of feature vectors for the plurality of content items comprises receiving signals comprising at least one of:

the individual user selecting a prior content suggestion;

an amount of time the individual user viewed a selection of the prior content suggestion; or an edit modification applied to the selection of the prior content suggestion.

6. The one or more non-transitory computer-readable media of claim 1, wherein the computer-readable instructions are further configured to cause the computing system to:

solve a first normalizing mapping function for the first machine learning model and a second normalizing mapping function for the second machine learning model by:

utilizing a first machine learning model dataset for the first machine learning model and a second machine learning model dataset for the second machine learning model;

wherein the first machine learning model dataset and the second machine learning model dataset comprise pairs of relevancy scores generated by the first machine learning model and the second machine learning model for suggested content items and end-user interaction labels.

7. The one or more non-transitory computer-readable media of claim 6, wherein, for the first machine learning model and the second machine learning model, the end-user interaction labels quantitatively reflect how end-users interacted with the suggested content items for which the end-user interaction labels correspond with the relevancy scores.

8. A computer-implemented method for cross-model score normalization, comprising:

generating, based in part on a plurality of end-user interactions for an individual user, a plurality of feature vectors for a plurality of content items, the plurality of feature vectors comprising feature vectors for a first content item of a file-type content item and feature vectors for a second content item of a folder-type content item;

selecting, based on receiving the feature vectors of the first content item of the file-type content item, a first machine learning model from a plurality of machine learning models to generate a first score, the first machine learning model trained to score the file-type content item;

selecting, based on receiving the feature vectors of athe second content item of the folder-type content item, a second machine learning model from the plurality of machine learning models to generate a second score, the second machine learning model trained to score the folder-type content item;

generating a plurality of expected end-user interaction scores based on the first score and the second score;

selecting one or more content items of a plurality of content items based on the plurality of expected end-user interaction scores; and sending a content suggestion of the one or more content items to an end-user computing device.

9. The computer-implemented method of claim 8, further comprising:

ranking the plurality of content items based on the plurality of expected end-user interaction scores; and selecting the one or more content items based on a ranking of the plurality of content items based on the plurality of expected end-user interaction scores.

10. The computer-implemented method of claim 8, further comprising:

mapping the first score and the second score generated by the first machine learning model and the second machine learning model for the plurality of content items to the plurality of expected end-user interaction scores based on a plurality of normalizing mapping functions, each normalizing mapping function, of the plurality of normalizing mapping functions, solved using an optimizer for the first machine learning model and the second machine learning model.

11. The computer-implemented method of claim 8, further comprising:

solve a first normalizing mapping function for the first machine learning model and a second normalizing mapping function for the second machine learning model by:

utilizing a first machine learning model dataset for the first machine learning model and a second machine learning model dataset for the second machine learning model;

wherein the first machine learning model dataset and the second machine learning model dataset comprise pairs of relevancy scores generated by the first machine learning model and the second machine learning model for suggested content items and end-user interaction labels.

12. The computer-implemented method of claim 11, wherein, for the first machine learning model and the second machine learning model, the end-user interaction labels quantitatively reflect how end-users interacted with the suggested content items for which the end-user interaction labels corresponds with the relevancy scores.

13. A computing system comprising:

one or more processors;

storage media; and one or more programs stored in the storage media, the one or more programs including instructions for cross-model score normalization, the instructions, when executed by the one or more processors, are capable of causing the computing system to perform:

generating, based in part on a plurality of end-user interactions for an individual user, a plurality of feature vectors for a plurality of content items, the plurality of feature vectors comprising feature vectors for a first content item of a file-type content item and feature vectors for a second content item of a cloud-document-type content item;

selecting, based on receiving the feature vectors of the first content item of the file-type content item, a first machine learning model from a plurality of machine learning models to generate a first score, the first machine learning model trained to score the file-type content item;

selecting, based on receiving the feature vectors of the second content item of the cloud-document-type content item, a second machine learning model from the plurality of machine learning models to generate a second score, the second machine learning model trained to score the cloud-document-type content item;

generating a plurality of expected end-user interaction scores based on the first score and the second score using a plurality of normalizing mapping functions, wherein each normalizing mapping function of the plurality of normalizing mapping functions corresponds to a machine learning model of the plurality of machine learning models;

selecting one or more content items of a plurality of content items based on the plurality of expected end-user interaction scores; and sending a content suggestion of the one or more content items to an end-user computing device.

14. The computing system of claim 13, wherein the instructions, when executed by the one or more processors, are further capable of causing the computing system to perform:

ranking the plurality of content items based on the plurality of expected end-user interaction scores; and selecting the one or more content items based on a ranking of the plurality of content items based on the plurality of expected end-user interaction scores.

15. The computing system of claim 13, wherein the instructions, when executed by the one or more processors, are further capable of causing the computing system to perform:

solving for a first normalizing mapping function for the first machine learning model and a second normalizing mapping function for the second machine learning model by:

utilizing a first machine learning model dataset for the first machine learning model and a second machine learning model dataset for the second machine learning model;

wherein the first machine learning model dataset and the second machine learning model dataset comprise pairs of relevancy scores generated by the first machine learning model and the second machine learning model for suggested content items and end-user interaction labels.

16. The computing system of claim 15, wherein, for the first machine learning model and the second machine learning model, the end-user interaction labels quantitatively reflect how end-users interacted with the suggested content items for which the end-user interaction labels correspond with the relevancy scores.

17. The computing system of claim 15, wherein solving for a normalizing mapping function of the plurality of normalizing mapping functions comprises maximizing a log-likelihood using an optimizer.

18. The computing system of claim 13, wherein, for the first machine learning model and the second machine learning model, the respective normalizing mapping function, of the plurality of normalizing mapping functions, is monotonic with respect to relevancy scores.

19. The computing system of claim 13, wherein, for first machine learning model and the second machine learning model, the respective normalizing mapping function, of the plurality of normalizing mapping functions, is parameterized as a sorted sequence of input and output values for a Bayesian-optimal piecewise linear function.

20. The computing system of claim 13, wherein the plurality of feature vectors further comprises feature vectors of a third content item type for a folder-type content item.

* * * * *